United States Patent
Jeong

(10) Patent No.: US 11,960,027 B2
(45) Date of Patent: Apr. 16, 2024

(54) LIDAR DATA BASED OBJECT RECOGNITION APPARATUS AND SEGMENT MERGING METHOD THEREOF

(71) Applicants: Hyundai Motor Company, Seoul (KR); Kia Motors Corporation, Seoul (KR)

(72) Inventor: Mu Gwan Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 379 days.

(21) Appl. No.: 17/073,873

(22) Filed: Oct. 19, 2020

(65) Prior Publication Data
US 2021/0405154 A1  Dec. 30, 2021

(30) Foreign Application Priority Data
Jun. 25, 2020  (KR) .................. 10-2020-0077808

(51) Int. Cl.
*G01S 7/48* (2006.01)
*G01S 17/42* (2006.01)
*G01S 17/931* (2020.01)
*G06T 7/11* (2017.01)
*G06T 7/70* (2017.01)

(52) U.S. Cl.
CPC ............ *G01S 7/4802* (2013.01); *G01S 17/42* (2013.01); *G01S 17/931* (2020.01); *G06T 7/11* (2017.01); *G06T 7/70* (2017.01); *G06T 2207/30252* (2013.01)

(58) Field of Classification Search
CPC ...... G01S 7/4802; G01S 17/42; G01S 17/931; G06T 7/11; G06T 7/70; G06T 2207/30252
See application file for complete search history.

(56) References Cited

U.S. PATENT DOCUMENTS

| | | | |
|---|---|---|---|
| 6,625,300 B1* | 9/2003 | Kyo | G06V 10/44 382/104 |
| 11,113,873 B1* | 9/2021 | Bosse | G06T 19/20 |
| 2020/0118277 A1* | 4/2020 | Mei | G06T 7/11 |
| 2020/0150275 A1* | 5/2020 | Zhu | G06T 19/20 |
| 2021/0099711 A1* | 4/2021 | Tourapis | H04N 19/147 |
| 2021/0248752 A1* | 8/2021 | Doemling | G06T 7/187 |
| 2021/0253131 A1* | 8/2021 | Sen | G01S 17/58 |

* cited by examiner

*Primary Examiner* — Oneal R Mistry
*Assistant Examiner* — Vaisali Rao Koppolu
(74) *Attorney, Agent, or Firm* — Fox Rothschild LLP

(57) ABSTRACT

A LIDAR data based object recognition apparatus merges segments over-segmented in a LIDAR data based segmentation process. The apparatus includes a segment generator generating a plurality of segments by grouping points acquired from a LIDAR sensor. A target segment selector selects a target segment that is a base for merging from the plurality of segments and a segment merging determination unit checks whether segments other than the target segment are mergeable segments and determines whether to merge the target segment and the mergeable segments based on attribute information of the target segment and the mergeable segments. A segment merger merges the target segment and the mergeable segments and outputs a merged segment.

15 Claims, 5 Drawing Sheets

LIDAR DATA BASED OBJECT RECOGNITION APPARATUS AND SEGMENT MERGING METHOD THEREOF

CROSS-REFERENCE TO RELATED APPLICATION(S)

This application claims the benefit of Korean Patent Application No. 10-2020-0077808, filed on Jun. 25, 2020, which is hereby incorporated by reference as if fully set forth herein.

BACKGROUND

Field of the Disclosure

The present disclosure relates to a LIDAR data based object recognition apparatus, and more specifically, to a LIDAR data based object recognition apparatus and a segment merging method thereof which merge segments over-segmented in a LIDAR data based segmentation process.

Discussion of the Related Art

In general, the core technology for development of autonomous driving and an advanced driver assistance system (ADAS) for vehicles is to acquire accurate and reliable information about neighboring objects. To acquire neighboring object information with high reliability, a method of combining information collected from a plurality of sensors mounted in a vehicle to extract necessary information and using the extracted information is widely used.

In a procedure of acquiring neighboring object information, a segmentation process of grouping LIDAR data points is necessary to recognize neighboring objects of a vehicle. The segmentation process is a process of grouping points reflected from the same object into a single segment using attribute information of a point cloud input through a LIDAR sensor.

However, among points actually reflected from an object and input, some points may not be recognized as normally input points due to surface reflection or some points may be eliminated according to a road surface processing logic or the like even when they are normally input. In such a case, a single object is over-segmented and output as multiple segments instead of being output as a single segment and thus object information becomes inaccurate.

Furthermore, in the case of vehicles having a d pillar that is provided at the rear thereof and is thin and approximately orthogonal, two or more segments corresponding to a single vehicle may be output due to points by which the rear bumper of the vehicle is recognized or points by which a structure inside the vehicle is recognized through a rear window of the vehicle and thus object information may become inaccurate although a single segment needs to be output for a single vehicle.

When object information becomes inaccurate as described above, the accuracy and reliability of an autonomous driving system with respect to opposing vehicle route prediction and host vehicle route generation may deteriorate. Accordingly, there is demand for development of an object recognition apparatus capable of merging a plurality of segments that has been over-segmented in a LIDAR data based segmentation process to improve the accuracy of object information.

SUMMARY

An object of the present disclosure is to provide a LIDAR data based object recognition apparatus and a segment merging method thereof which may increase the accuracy of object information by merging a plurality of over-segmented segments based on segment merging conditions and attribute information to thereby improve driving safety performance of an autonomous driving system. It will be appreciated by persons skilled in the art that the objects that could be achieved with the present disclosure are not limited to what has been particularly described hereinabove and the above and other objects that the present disclosure could achieve will be more clearly understood from the following detailed description.

To accomplish the objects, a LIDAR data based object recognition apparatus according to an exemplary embodiment of the present disclosure may include: a segment generator configured to generate a plurality of segments by grouping points acquired from a LIDAR sensor; a target segment selector configured to select a target segment that is a base for merging from the plurality of segments; a segment merging determination unit configured to check whether segments other than the target segment are mergeable (e.g., capable of being merged) segments and determine whether to merge the target segment and the mergeable segments based on attribute information of the target segment and the mergeable segments; and a segment merger configured to merge the target segment and the mergeable segments and to output a merged segment.

Furthermore, a segment merging method of a LIDAR data based object recognition apparatus according to an exemplary embodiment of the present disclosure is a segment merging method of a LIDAR data based object recognition apparatus including a segment generator, a target segment selector, a segment merging determination unit, and a segment merger, and the segment merging method may include: the segment generator configured to generate a plurality of segments by grouping points acquired from a LIDAR sensor; the target segment selector configured to select a target segment that is a base for merging from the plurality of segments; the segment merging determination unit configured to check whether segments other than the target segment are mergeable segments; the segment merging determination unit configured to determine whether to merge the target segment and the mergeable segments based on attribute information of the target segment and the mergeable segments; and the segment merger configured to merge the target segment and the mergeable segments and output a merged segment.

Furthermore, a non-transitory computer readable recording medium in which a program for executing a segment merging method of a LIDAR data based object recognition apparatus according to an exemplary embodiment of the present disclosure may perform processes provided by the segment merging method of the LIDAR data based object recognition apparatus.

Additionally, a vehicle according to an exemplary embodiment of the present disclosure may include: a LIDAR sensor; and an object recognition apparatus configured to recognize an object by merging over-segmented segments based on points acquired from the LIDAR sensor. The object recognition apparatus is configured to generate a plurality of segments by grouping points acquired from a LIDAR sensor, to select a target segment that is a base for merging from the plurality of segments, to check whether segments other than the target segment are mergeable segments, to determine whether to merge the target segment and the mergeable segments based on attribute information of the target segment and the mergeable segments, and to merge the target segment and the mergeable segments and output a merged segment.

The LIDAR data based object recognition apparatus and the segment merging method thereof according to at least one exemplary embodiment of the present disclosure, configured as above, may increase the accuracy of object information by merging a plurality of over-segmented segments based on segment merging conditions and attribute information to thereby improve driving safety performance of an autonomous driving system.

The present disclosure may improve accuracy with respect to a longitudinal distance and a vertical speed of a LIDAR object by merging a plurality of over-segmented segments into a single segment and improve continuity of an object ID according to reduction of over segmentation for the same LIDAR object to increase the accuracy of opposing vehicle route prediction and host vehicle route generation of an autonomous driving system.

It will be appreciated by persons skilled in the art that the effects that may be achieved with the present disclosure are not limited to what has been particularly described hereinabove and other advantages of the present disclosure will be more clearly understood from the following detailed description.

BRIEF DESCRIPTION OF THE DRAWINGS

The above and other features of the present disclosure will now be described in detail with reference to exemplary embodiments thereof illustrated in the accompanying drawings which are given hereinbelow by way of illustration only, and thus are not limitative of the present disclosure, and wherein.

DETAILED DESCRIPTION

Figure 1:
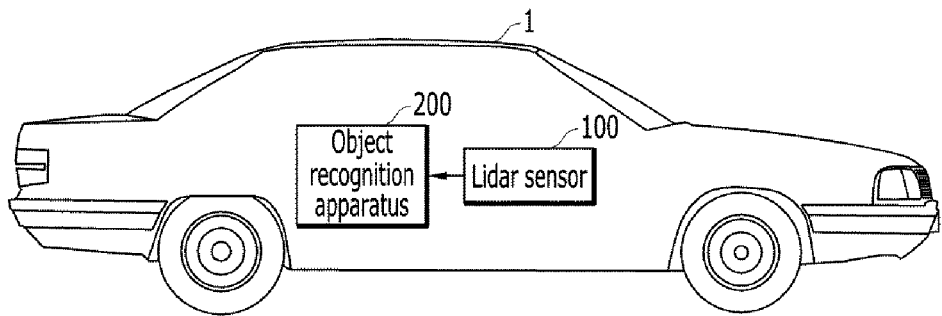
FIG. 1 is a diagram for describing a vehicle including an object recognition apparatus according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings. Wherever possible, the same reference numbers will be used throughout the drawings to refer to the same or like parts.

The detailed description of the exemplary embodiments of the present disclosure will be given to enable those skilled in the art to implement and practice the disclosure with reference to the attached drawings. However, the present disclosure may be implemented in various different forms and is not limited to embodiments described herein. In addition, parts that are not related to description will be omitted for clear description in the drawings, and the same reference numbers will be used throughout this specification to refer to the same or like parts.

Through the specification, when it is said that some part "includes" a specific element, this means that the part may further include other elements, not excluding the same, unless mentioned otherwise. Further, the term "-er(or)", "module", "portion" or "part" is used to signify a unit for performing at least one function or operation, and the unit can be realized as hardware, software, or in combination of both.

Hereinafter, an apparatus for recognizing an object based on LIDAR data and a segment merging method thereof applicable to exemplary embodiments of the present disclosure will be described in detail with reference to FIGS. 1 to 9.

FIG. 1 is a diagram for describing a vehicle including an object recognition apparatus according to an exemplary embodiment of the present disclosure. As shown in FIG. 1, a vehicle 1 according to the present disclosure may include a LIDAR sensor 100 and an object recognition apparatus 200 configured to merge over-segmented segments based on points acquired from the LIDAR sensor 100 to recognize an object.

In particular, the object recognition apparatus 200 may be configured to generate a plurality of segments by grouping points acquired from the LIDAR sensor 100, select a target segment that is a base for merging from the plurality of segments, check whether segments other than the target segment are mergeable segments, determine whether to merge the target segment and mergeable segments based on attribute information of the target segment and the mergeable segments, merge the target segment and the mergeable segments and output a merged segment.

When generating the segments, the object recognition apparatus 200 may be configured to perform a segmentation process of grouping points using attribute information of a point cloud input through the LIDAR sensor 100 to generate segments. In other words, the object recognition apparatus 200 may be configured to generate the segments by grouping the points on the basis of attribute information including x, y and z coordinate information of each point.

In addition, when selecting the target segment, the object recognition apparatus 200 may be configured to check a longitudinal length and a lateral length of each segment, check whether the lateral length of a segment satisfies a first condition, check whether the longitudinal length of the segment satisfies a second condition when the lateral length of the segment satisfies the first condition, and select the segment as a target segment when the longitudinal length of the segment satisfies the second condition.

Particularly, the first condition may be "lateral length of segment<vehicle full width reference value+α1 (here, α1 is a margin value taking a calibration difference of the LIDAR sensor into account)". For example, the vehicle full width reference value may be about 1.7 m according to regulations of the country, but it is not limited thereto. In addition, the second condition may be "minimum longitudinal length of small vehicle<longitudinal length of segment<maximum longitudinal length of small vehicle–α2 (here, α2 is a margin value taking a merging error when merging is performed on the basis of a maximum longitudinal length into account)".

When checking whether the longitudinal length of a segment satisfies the first condition, the object recognition apparatus 200 may be configured to check whether the longitudinal length of the segment satisfies a third condition when the longitudinal length of the segment does not satisfy the first condition and select the segment as a target segment when the longitudinal length of the segment satisfies the third condition. In particular, the third condition may be "minimum longitudinal length of vehicle greater than small vehicle<longitudinal length of segment<maximum longitudinal length of vehicle larger than small vehicle–α3 (here, α3 is a margin value taking a merging error when merging is performed based on a maximum longitudinal length into account)".

When checking whether segments other than the target segment are mergeable segments, the object recognition apparatus 200 may be configured to determine the segments as mergeable segments (e.g., segments capable of being merged) when segments other than the target segment (e.g., a first target segment) do not correspond to any of another target segment (e.g., a second target segment), a segment that has already been merged into another target segment, an invalid segment, and a segment having a small number of points. In particular, an invalid segment may include a segment determined to be invalid by another logic before a merging logic, but it is not limited thereto.

A segment having a small number of points may have a smaller number of points than a preset reference number. A segment having a small number of points may have a number of points corresponding to noise as necessary. Further, the object recognition apparatus 200 may be configured to determine whether to merge the target segment and the mergeable segments based on at least one of first attribute information and second attribute information of the target segment and the mergeable segments.

For example, the first attribute information may include X-, Y- and Z-axis length information of the target segment and the mergeable segments and the second attribute information may include point layer range information of the target segment and the mergeable segments. As described above, the present disclosure may increase the accuracy of object information by merging a plurality of over-segmented segments based on segment merging conditions and attribute information to thereby improve driving safety performance of an autonomous driving system.

Furthermore, the present disclosure may improve accuracy with respect to a longitudinal distance and a vertical speed of a LIDAR object by merging a plurality of over-segmented segments into a single segment and improve continuity of an object ID according to reduction of over segmentation for the same LIDAR object to increase the accuracy of opposing vehicle route prediction and host vehicle route generation of an autonomous driving system.

Figure 2:
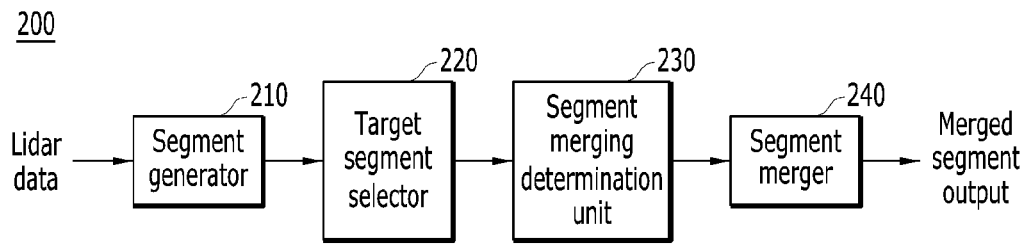
FIG. 2 is a block diagram for describing a LIDAR data based object recognition apparatus according to an exemplary embodiment of the present disclosure.

FIG. 2 is a block diagram for describing the apparatus for recognizing an object based on LIDAR data according to an exemplary embodiment of the present disclosure. As shown in FIG. 2, the object recognition apparatus 200 may include a segment generator 210, a target segment selector 220, a segment merging determination unit 230, and a segment merger 240. Each of the elements of the object recognition apparatus may be operated by a controller of the apparatus.

In particular, the segment generator 210 may be configured to generate a plurality of segments by grouping points acquired from a LIDAR sensor. For example, the segment generator 210 may be configured to generate the segments by grouping the points based on attribute information including x, y and z coordinate information of each point. Subsequently, the target segment selector 220 may be configured to select a target segment that is a base for merging from the plurality of segments.

The target segment selector 220 may be configured to check the size of each segment and select a segment that corresponds to a vehicle as a target segment. In other words, the target segment selector 220 may be configured to check a longitudinal length and a lateral length of each segment, check whether the lateral length of a segment satisfies the first condition, check whether the longitudinal length of the segment satisfies the second condition when the lateral length of the segment satisfies the first condition, and select the segment as a target segment when the longitudinal length of the segment satisfies the second condition.

Particularly, the first condition may be "lateral length of segment<vehicle full width reference value+α1 (here, α1 is a margin value taking a calibration difference of the LIDAR sensor into account)". For example, the vehicle full width reference value may be about 1.7 m according to regulations of the country, but it is not limited thereto.

In this manner, the present disclosure may set different segment merging bases for vehicle sizes to minimize side effects due to erroneous operation of the segment merging logic. For example, a vehicle may be classified as a small vehicle when the width thereof is about 1.2 m or longer and less than (1.7 m+α1) m (here, α1 is a margin value taking a calibration difference of the LIDAR sensor into account), and a vehicle may be classified as a medium and large-sized vehicle when the width thereof is about (1.7 m+α1) m or longer and less than about 2 m. However, the present disclosure is not limited thereto.

When a plurality of LIDAR sensors is used, a point segment corresponding to a vehicle object may be output as a larger segment than the actual vehicle if calibration of each LIDAR sensor is inaccurate. Accordingly, α1 that is a margin value is added in consideration of this. In addition, the second condition may be "minimum longitudinal length of small vehicle<longitudinal length of segment<maximum longitudinal length of small vehicle−α2 (here, α2 is a margin value taking a merging error when merging is performed based on a maximum longitudinal length into account)".

For example, a minimum longitudinal length of a small vehicle may be determined based on cumulative data of segments varied according to the position at which a LIDAR sensor is set based on a segment corresponding to the rear bumper of the small vehicle. Further, a maximum longitudinal length of a small vehicle may be determined based on a result value obtained by subtracting a margin value taking a merging error into account from the maximum longitudinal length when merging is performed based on the maximum longitudinal length of the small vehicle. In other words, the margin value α2 taking a merging error into account may improve the reliability of the segment merging logic of the present disclosure.

Next, when checking whether the lateral length of the segment satisfies the first condition, the target segment selector 220 may be configured to check whether the longitudinal length of the segment satisfies the third condition when the longitudinal length of the segment does not satisfy the first condition and select the segment as a target segment when the longitudinal length of the segment satisfies the third condition. In particular, the third condition may be "minimum longitudinal length of vehicle larger than small vehicle<longitudinal length of segment<maximum longitudinal length of vehicle larger than small vehicle−α3 (here, α3 is a margin value taking a merging error when merging is performed based on a maximum longitudinal length into account)". For example, a minimum longitudinal length of a vehicle larger than a small vehicle may be determined based on cumulative data of segments varied according to the position at which a LIDAR sensor is set based on a segment that corresponds to the rear bumper of the vehicle larger than the small vehicle.

Further, a maximum longitudinal length of the vehicle larger than the small vehicle may be determined based on a result value obtained by subtracting a margin value taking a merging error into account from the maximum longitudinal length when merging is performed based on the maximum longitudinal length of the vehicle larger than the small vehicle. In other words, the margin value α3 taking a merging error into account may improve the reliability of the segment merging logic of the present disclosure.

The segment merging determination unit 230 may be configured to check whether segments other than the target segment are mergeable segments and determine whether to merge the target segment and the mergeable segments based on attribute information of the target segment and the mergeable segments. In particular, when checking whether segments other than the target segment are mergeable segments, the segment merging determination unit 230 may be configured to determine the segments as mergeable segments when the segments other than the target segment (e.g., first target segment) do not correspond to any of another target segment (e.g., a second target segment), a segment that has already been merged with another target segment, an invalid segment, and a segment having a small number of points.

For example, an invalid segment may include a segment determined to be invalid by another logic before the merging logic, but it is not limited thereto. A segment having a small number of points may have a smaller number of points than a preset reference number, but it is not limited thereto. A segment having a small number of points may have a number of points corresponding to noise as necessary.

The segment merging determination unit 230 may then be configured to determine whether to merge the target segment and the mergeable segments based on at least one of the first attribute information and the second attribute information of the target segment and the mergeable segments. In particular, the first attribute information may include X-, Y- and Z-axis length information of the target segment and the mergeable segments.

In addition, the second attribute information may include point layer range information of the target segment and the mergeable segments. For example, the segment merging determination unit 230 may be configured to determine merging of the target segment and the mergeable segments in response to determining that the target segment includes the mergeable segments based on X-, Y- and Z-axis lengths from among attribute information of the target segment and the mergeable segments.

When determining whether the target segment includes the mergeable segments, the segment merging determination unit 230 may be configured to determine a Z-axis length of the target segment based on a maximum Z-axis length value+α4 (here, α4 is a margin value taking merging of segments including points positioned in front of the rear bumper of the vehicle into account). Alternatively, the segment merging determination unit 230 may be configured to determine merging of the target segment and the mergeable segments in response to determining that the size of a merged segment, which is estimated when the target segment and the mergeable segments are merged based on the X-, Y- and Z-axis lengths from among the attribute information of the target segment and the mergeable segments, is less than a vehicle size.

When determining that the estimated size is less than the vehicle size, the segment merging determination unit 230 may be configured to determine the Z-axis length of the target segment based on a maximum Z-axis length value+α4 (here, α4 is a margin value taking merging of segments including points positioned in front of the rear bumper of the vehicle into account). Alternatively, the segment merging determination unit 230 may be configured to determine merging of the target segment and the mergeable segments in response to determining that a "point layer range constituting the target segment+α5 (here, α5 is a margin value taking merging of segments including points positioned in front of the rear bumper of the vehicle)" includes a point layer range constituting the mergeable segments based on the point layer ranges from among the attribute information of the target segment and the mergeable segments.

In other words, the margin values α4 and α5 may improve the reliability and accuracy of the segment merging logic of the present disclosure. Next, the segment merger 240 may be configured to merge the target segment and the mergeable segments and output a merged segment in response to determining merging of the target segment and the mergeable segments.

Figure 3:
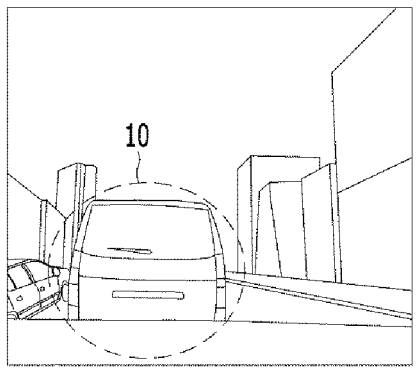
FIGS. 3 to 5 are diagrams showing comparison of LIDAR track object outputs according to whether a segment merging logic of the present disclosure is applied.
Figure 4:
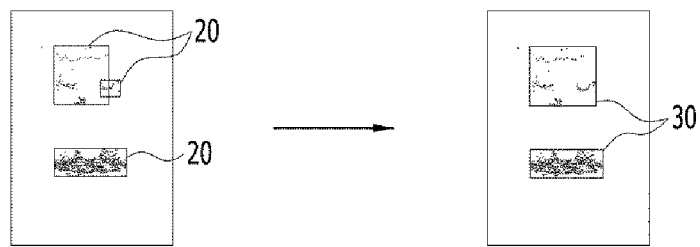
Figure 5:
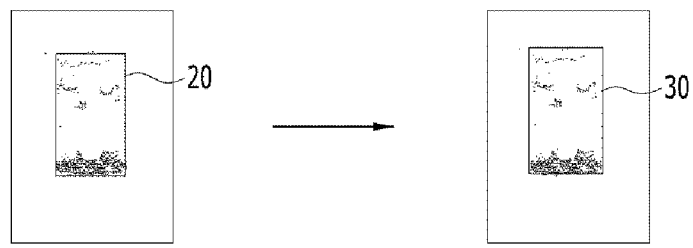

FIGS. 3 to 5 are diagrams showing comparison of LIDAR track object outputs according to whether the segment merging logic of the present disclosure is applied. FIG. 3 is a diagram showing a surrounding image of a host vehicle, FIG. 4 is a diagram showing output of a LIDAR track object when the segment merging logic is not applied in response to a surrounding image, and FIG. 5 is a diagram showing output of the LIDAR track object when the segment merging logic is applied in response to a surrounding image.

As shown in FIGS. 3 and 4, in a case in which the segment merging logic according to the present disclosure is not applied, when LIDAR data with respect to a vehicle object 10 is acquired and a segmentation process is performed thereon, a plurality of segments 20 may be generated in response to the vehicle object 10 and a LIDAR track object 30 may be divided into a plurality of parts and output due to the segments 20. Accordingly, it may be ascertained that object information is inaccurate.

For example, since structures inside the vehicle are output as segments through the rear window of the vehicle object 10, a plurality of segments 20 may be generated for the single vehicle object 10 and the LIDAR track object 30 may be divided into a plurality of parts. Accordingly, inaccurate object information with low reliability may be provided. On the other hand, when the segment merging logic according to the present disclosure is applied, as shown in FIGS. 3 and 5, when LIDAR data with respect to the vehicle object 10 of FIG. 3 is acquired and a segmentation process is performed thereon, a plurality of segments generated in response to the vehicle object 10 is integrated into a single segment 20 through the segment merging logic, and thus it may be ascertained that a single LIDAR track object 30 is output and the accuracy and reliability of object information are improved.

Figure 6:
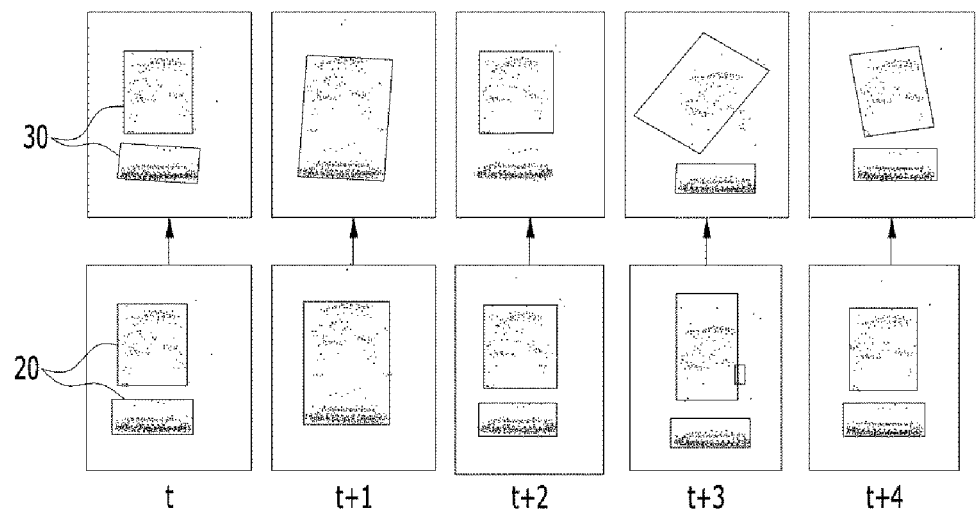
FIG. 6 is a diagram showing outputs of LIDAR track objects by time before application of the segment merging logic of the present disclosure.
Figure 7:
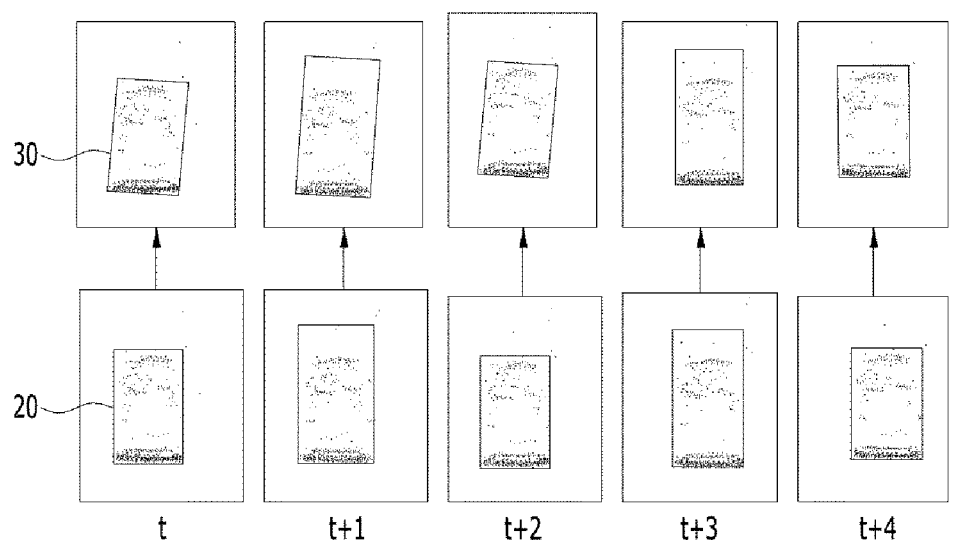
FIG. 7 is a diagram showing outputs of LIDAR track objects by time after application of the segment merging logic of the present disclosure.

FIG. 6 is a diagram showing outputs of LIDAR track objects by time before application of the segment merging logic of the present disclosure and FIG. 7 is a diagram showing outputs of LIDAR track objects by time after application of the segment merging logic of the present disclosure. As shown in FIG. 6, it may be ascertained that a plurality of segments 20 may be output for a single vehicle as a result of segmentation for the vehicle and a LIDAR track object ID of the rear side of the vehicle changes between t+2 and t+3 when the segment merging logic of the present disclosure is not applied.

On the other hand, as shown in FIG. 7, it may be ascertained that a single segment 20 is output for a single vehicle as a result of segmentation for the vehicle and the same LIDAR track object ID is output when the segment merging logic of the present disclosure is applied. Accordingly, it may be ascertained that the present disclosure contributes to improvement in the accuracy and continuity of a LIDAR track object ID and longitudinal length accuracy with respect to the LIDAR track object ID.

Figure 8:
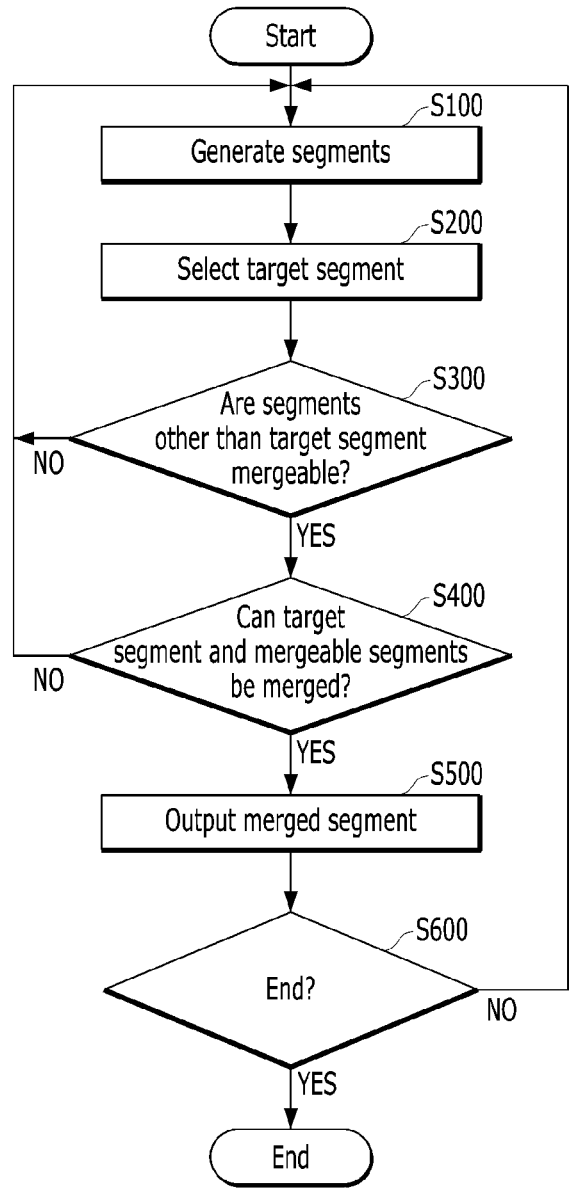
FIGS. 8 and 9 are flowcharts for describing a segment merging method according to an embodiment of the present disclosure.
Figure 9:
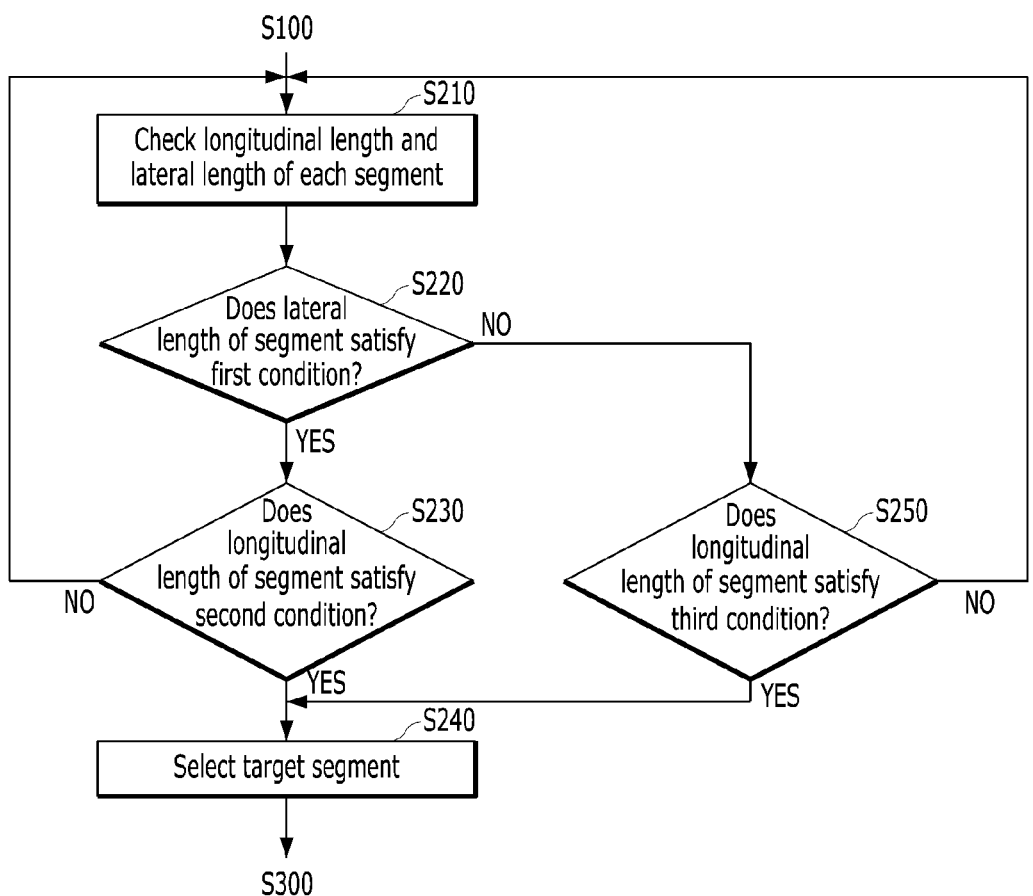

FIGS. 8 and 9 are flowcharts for describing a segment merging method according to an exemplary embodiment of the present disclosure. The method described herein below may be executed by a processor of the system controller. As shown in FIG. 8, the present disclosure may generate a plurality of segments by grouping points acquired from a LIDAR sensor (S100). In particular, the present disclosure may be configured to generate the segments by grouping the points based on attribute information including x, y and z coordinate information of each point.

Subsequently, the present disclosure may be configured to select a target segment that is a base for merging from the plurality of segments (S200). The present disclosure may be configured to check the size of each segment and select a segment corresponding to a vehicle as a target segment. Subsequently, the present disclosure may be configured to check whether segments other than the target segment are mergeable segments (S300). In particular, the present disclosure may be configured to determine the segments as mergeable segments when the segments other than the target segment do not correspond to any of another target segment, a segment that has already been merged into another target segment, an invalid segment, and a segment having a small number of points.

Subsequently, the present disclosure may be configured to determine whether to merge the target segment and the mergeable segments based on attribute information of the target segment and the mergeable segments (S400). In particular, the present disclosure may be configured to determine whether to merge the target segment and the mergeable segments based on at least one of first attribute information and second attribute information of the target segment and the mergeable segments.

For example, the first attribute information may include X-, Y- and Z-axis length information of the target segment and the mergeable segments and the second attribute information may include point layer range information of the target segment and the mergeable segments. Subsequently, the present disclosure may be configured to merge the target segment and the mergeable segments and output a merged segment (S500). Subsequently, the present disclosure may be configured to check whether to end the segment merging logic (S600) and ends the segment merging logic when the segment merging logic needs to end.

FIG. 9 is a flowchart for describing step S200 of selecting a target segment in detail. As shown in FIG. 9, the present disclosure may be configured to check the longitudinal length and the lateral length of each segment (S210). Subsequently, the present disclosure may be configured to check whether the lateral length of a segment satisfies the first condition (S220). In particular, the first condition may be "lateral length of segment<vehicle full width reference value+α1 (here, α1 is a margin value taking a calibration difference of a LIDAR sensor into account)".

Subsequently, the present disclosure may be configured to check whether the longitudinal length of the segment satisfies the second condition when the lateral length of the segment satisfies the first condition (S230). The second condition may be "minimum longitudinal length of small vehicle<longitudinal length of segment<maximum longitudinal length of small vehicle−α2 (here, α2 is a margin value taking a merging error when merging is performed based on a maximum longitudinal length into account)".

Subsequently, the present disclosure may be configured to select the segment as a target segment when the longitudinal length of the segment satisfies the second condition (S240). Then, the present disclosure may be configured to check whether the longitudinal length of the segment satisfies the third condition (S250). The third condition may be "minimum longitudinal length of vehicle larger than small vehicle<longitudinal length of segment<maximum longitudinal length of vehicle larger than small vehicle−α3 (here, α3 is a margin value taking a merging error when merging is performed based on a maximum longitudinal length into account)". Subsequently, the present disclosure may be configured to select the segment as a target segment when the longitudinal length of the segment satisfies the third condition (S240).

As described above, the present disclosure may increase the accuracy of object information by merging a plurality of over-segmented segments on the basis of segment merging conditions and attribute information to thereby improve driving safety performance of an autonomous driving system. Furthermore, the present disclosure may improve accuracy with respect to a longitudinal distance and a vertical speed of a LIDAR object by merging a plurality of over-segmented segments into a single segment and improve continuity of an object ID according to reduction of over segmentation for the same LIDAR object to increase the accuracy of opposing vehicle route prediction and host vehicle route generation of an autonomous driving system.

Meanwhile, the present disclosure may be realized as a non-transitory computer-readable recording medium in which a program for executing the segment merging method of the LIDAR data based object recognition apparatus is recorded to perform processes provided by the segment merging method of the LIDAR data based object recognition apparatus.

The above-described present disclosure may be realized as computer-readable code in a medium in which a program is recorded. Computer-readable media include all types of recording devices in which data readable by computer systems is stored. Examples of computer-readable media include a hard disk drive (HDD), a solid state drive (SSD), a silicon disk drive (SDD), a ROM, a RAM, a CD-ROM, a magnetic tape, a floppy disk, an optical data storage device, etc.

What is claimed is:

1. A LIDAR data based object recognition apparatus, comprising:
    a segment generator configured to generate a plurality of segments by grouping points of a point cloud acquired from a LIDAR sensor;
    a target segment selector configured to select a target segment among the plurality of segments by:
        checking a longitudinal length and a lateral length of a segment;
        checking whether the lateral length of the segment satisfies a first condition;
        checking whether the longitudinal length of the segment satisfies a second condition when the lateral length of the segment satisfies the first condition; and
        selecting the segment as a target segment when the longitudinal length of the segment satisfies the second condition;
        wherein the first condition is that the lateral length of the segment is less than a first reference value corresponding to a vehicle width;
    a segment merging determination unit configured to check whether segments other than the target segment among the plurality of segments are mergeable segments and determine whether to merge the target segment and the mergeable segments based on attribute information of the target segment and the mergeable segments; and
    a segment merger configured to merge the target segment and the mergeable segments to output a merged segment.

2. The LIDAR data based object recognition apparatus of claim 1, wherein the segment generator is configured to generate the segments by grouping the point based on attribute information including x, y and z coordinate information of each point.

3. The LIDAR data based object recognition apparatus of claim 1, wherein the second condition is that the longitudinal length of the segment is greater than a second reference value corresponding to a minimum longitudinal length of a small vehicle and less than a third reference value corresponding to a maximum longitudinal length of the small vehicle.

4. The LIDAR data based object recognition apparatus of claim 1, wherein, when checking whether the lateral length of the segment satisfies the first condition, the target segment selector is configured to check whether the longitudinal length of the segment satisfies a third condition when the lateral length of the segment does not satisfy the first condition and select the segment as a target segment when the longitudinal length of the segment satisfies the third condition.

5. The LIDAR data based object recognition apparatus of claim 4, wherein the third condition is that the longitudinal length of the segment is greater than a fourth reference value corresponding to a minimum longitudinal length of a vehicle larger than a small vehicle and less than a fifth reference value corresponding to a maximum longitudinal length of the vehicle larger than the small vehicle.

6. The LIDAR data based object recognition apparatus of claim 1, wherein, when checking whether the segments other than the target segment among the plurality of segments are mergeable segments, the segment merging determination unit is configured to determine the segments as mergeable segments when the segments other than the target segment do not correspond to any of another target segment, a segment that has already been merged into another target segment, an invalid segment, and a segment having a small number of points.

7. The LIDAR data based object recognition apparatus of claim 1, wherein the segment merging determination unit is configured to determine whether to merge the target segment and the mergeable segments based on first attribute information and second attribute information of the target segment and the mergeable segments.

8. The LIDAR data based object recognition apparatus of claim 7, wherein the first attribute information includes X-, Y- and Z-axis length information of the target segment and the mergeable segments and the second attribute information includes point layer range information of the target segment and the mergeable segments.

9. A segment merging method of a LIDAR data based object recognition apparatus, the segment merging method comprising:
    generating, by a processor, a plurality of segments by grouping points of a point cloud acquired from a LIDAR sensor;
    selecting, by the processor, a target segment among the plurality of segments, wherein the selecting of the target segment includes:
        checking, by the processor, a longitudinal length and a lateral length of a segment;

checking, by the processor, whether the lateral length of the segment satisfies a first condition;

checking, by the processor, whether the longitudinal length of the segment satisfies a second condition when the lateral length of the segment satisfies the first condition; and selecting, by the processor, the segment as a tar get segment when the longitudinal length of the segment satisfies the second condition;

wherein the first condition is that the lateral length of the segment is less than a first reference value corresponding to a vehicle width; and wherein the second condition is that the longitudinal length of the segment is greater than a second reference value corresponding to a minimum longitudinal length of a small vehicle and less than a third reference value corresponding to a maximum longitudinal length of the small vehicle;

checking, by the processor, whether others than the target segment are mergeable segments;

determining, by the processor, whether to merge the target segment and the mergeable segments based on attribute information of the target segment and the mergeable segments; and merging, by the processor, the target segment and the mergeable segments to output a merged segment.

10. A segment meriting method of a LIDAR data based object recognition apparatus, the segment merging method comprising:

generating, by a processor, a plurality of segments by performing a same segmentation process of grouping points of a point cloud acquired from a LIDAR sensor;

selecting, by the processor, a target segment among the plurality of segments;

checking, by the processor, whether others than the target segment are mergeable segments;

determining, by the processor, whether to merge the target segment and the mergeable segments based on attribute information of the target segment and the mergeable segments; and merging, by the processor, the target segment and the mergeable segments generated by the same segmentation process to output a merged segment;

wherein the selecting of the target segment includes:

checking, by the processor, a longitudinal length and a lateral length of a segment;

checking, by the processor, whether the lateral length of the segment satisfies a first condition;

checking, by the processor, whether the longitudinal length of the segment satisfies a second condition when the lateral length of the segment satisfies the first condition; and selecting, by the processor, the segment as a target segment when the longitudinal length of the segment satisfies the second condition;

wherein the checking of whether the lateral length of the segment satisfies the first condition includes:

checking, the processor, whether the longitudinal length of the segment satisfies a third condition when the lateral length of the segment does not satisfy the first condition; and selecting, by the processor, the segment as a target segment when the longitudinal length of the segment satisfies the third condition;

wherein the third condition is that the longitudinal length of the segment is greater that a fourth reference value corresponds to a minimum longitudinal length of a vehicle larger than a small vehicle and less than a fifth reference value corresponds to a maximum longitudinal length of the vehicle larger than the small vehicle.

11. The segment merging method of claim 9, wherein the checking of whether the segments other than the target segment among the plurality of segments are mergeable segments includes:

determining, by the processor, the segments as mergeable segments when the segments other than the target segment do not correspond to any of another target segment, a segment that has already been merged into another target segment, an invalid segment, and a segment having a small number of points.

12. The segment merging method of claim 9, wherein the determining of whether to merge the target segment and the mergeable segments includes:

determining, by the processor, whether to merge the target segment and the mergeable segments based on first attribute information and second attribute information of the target segment and the mergeable segments.

13. The segment merging method of claim of claim 12, wherein the first attribute information includes X-, Y- and Z-axis length information of the target segment and the mergeable segments and the second attribute information includes point layer range information of the target segment and the mergeable segments.

14. A non-transitory computer readable recording medium in which a program for executing the method according to claim 9 is recorded.

15. A vehicle, comprising:

a LIDAR sensor; and an object recognition apparatus configured to recognize an object by merging over-segmented segments based on points acquired from the LIDAR sensor, wherein the object recognition apparatus is configured to:

generate a plurality of segments by grouping points of a point cloud acquired from a LIDAR sensor;

select a target segment among the plurality of segments by:

checking a longitudinal length and a lateral length of a segment;

checking whether the lateral length of the segment satisfies a first condition;

checking whether the longitudinal length of the segment satisfies a second condition when the lateral length of the segment satisfies the first condition; and selecting the segment as a target segment when the longitudinal length of the segment satisfies the second condition;

wherein the first condition is that the lateral length of the segment is less than a first reference value corresponding to a vehicle width; and wherein the second condition is that the longitudinal length of the segment is greater than a second reference value corresponding to a minimum longitudinal length of a small vehicle and less than a third reference value corresponding to a maximum longitudinal length of the small vehicle;

check whether segments other than the target segment among the plurality of segments are mergeable segments; and determine whether to merge the target segment and the mergeable segments based on attribute information of the target segment and the mergeable segments, and to merge the target segment and the mergeable segments to output a merged segment.

* * * * *